United States Patent
Honda et al.

(10) Patent No.: US 7,885,989 B2
(45) Date of Patent: Feb. 8, 2011

(54) ENCODING CIRCUIT AND DIGITAL SIGNAL PROCESSING CIRCUIT

(75) Inventors: Iwao Honda, Gunma (JP); Hideki Ohashi, Gunma (JP); Takashi Kuroda, Gunma (JP); Noriyuki Tomita, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1083 days.

(21) Appl. No.: 11/614,821

(22) Filed: Dec. 21, 2006

(65) Prior Publication Data

US 2007/0146194 A1 Jun. 28, 2007

(30) Foreign Application Priority Data

Dec. 22, 2005 (JP) .............................. 2005-369847

(51) Int. Cl.
*G06F 7/00* (2006.01)
(52) U.S. Cl. .................. 708/204; 708/209; 708/319; 380/239; 380/281
(58) Field of Classification Search ................ 708/204, 708/209, 319; 308/239, 281
See application file for complete search history.

(56) References Cited

U.S. PATENT DOCUMENTS

| | | | | | |
|---|---|---|---|---|---|
| 4,229,821 A | * | 10/1980 | de Jager et al. | ............. | 375/280 |
| 4,771,458 A | * | 9/1988 | Citta et al. | ................. | 380/239 |
| 5,222,035 A | * | 6/1993 | Nakase et al. | ................ | 708/319 |
| 7,606,850 B2 | * | 10/2009 | Johnson | ..................... | 708/277 |
| 2007/0061388 A1 | * | 3/2007 | Carlough et al. | ............. | 708/204 |

FOREIGN PATENT DOCUMENTS

JP 06-044051 2/1994

* cited by examiner

*Primary Examiner*—Timothy Edwards, Jr.
(74) *Attorney, Agent, or Firm*—SoCal IP Law Group LLP; Steven C. Sereboff; John E. Gunther

(57) ABSTRACT

An encoding circuit is disclosed which comprises: a data-for-encoding storing register that stores n-bit data for encoding; a data-for-calculation storing register that stores m-bit data for calculation generated by shifting the data for encoding; a shifter that shifts the data for encoding stored in the data-for-encoding storing register, and shifts and inputs the shifted data into the data-for-calculation storing register; a first coefficient register that stores m-bit first coefficient data indicating a first coefficient for executing encoding; a first logic circuit that is inputted with the data for calculation stored in the data-for-calculation storing register and the first coefficient data stored in the first coefficient register and outputs the logical product for each bit of the data for calculation and the first coefficient data; and a second logic circuit that is inputted with m-bit data outputted from the first logic circuit and outputs the exclusive logical sum of the m-bit data as the encoded data.

20 Claims, 6 Drawing Sheets

US 7,885,989 B2

ENCODING CIRCUIT AND DIGITAL SIGNAL PROCESSING CIRCUIT

CROSS-REFERENCE TO RELATED APPLICATION

This application claims the benefit of priority to Japanese Patent Application No. 2005-369847, filed Dec. 22, 2005, of which full contents are incorporated herein by reference.

BACKGROUND OF THE INVENTION

1. Field of the Invention

The present invention relates to an encoding circuit and a digital signal processing circuit.

2. Description of the Related Art

In a mobile communication apparatus such as a mobile phone, a DSP (Digital Signal Processor) that is a processor to process digital signals is often used. In a DSP used in a mobile communication apparatus as above, an encoding process using a convolution code, a block code, etc., is generally executed to make bit errors in data that is transmitted and received correctable. The DSP can generate encoded data by realizing a one-bit shifting process, a process to execute logical product, a process to execute exclusive logical addition, etc., by software (see, for example, Japanese Patent Application Laid-Open Publication No. 1994-44051).

However, when encoded data is generated by software, several cycles of processes such as a shifting process, a process to execute logical product, a process to execute exclusive logical addition, and, in addition, a process for data loading to a register are necessary to generate one-bit encoded data. Therefore, the amount of processing load is increased in proportion to the number of bits of a digital signal and this is an impediment in improving the speed of communication.

SUMMARY OF THE INVENTION

The present invention was conceived in view of the above problem and the object thereof is to provide an encoding circuit that can execute an encoding process at a high speed and a digital signal processing circuit that can execute an encoding process at a high speed using the encoding circuit.

In order to achieve the above object, according to an aspect of the present invention there is provided an encoding circuit comprising: a data-for-encoding storing register that stores n-bit data for encoding; a data-for-calculation storing register that stores m-bit data for calculation generated by shifting the data for encoding; a shifter that shifts the data for encoding stored in the data-for-encoding storing register, and shifts and inputs the shifted data into the data-for-calculation storing register; a first coefficient register that stores m-bit first coefficient data indicating a first coefficient for executing encoding; and an encoding logic circuit that is inputted with the data for calculation stored in the data-for-calculation storing register and the first coefficient data stored in the first coefficient register, encodes the data for calculation based on the first coefficient data, and outputs the encoded data.

The encoding logic circuit may comprise a first logic circuit that is inputted with the data for calculation stored in the data-for-calculation storing register and the first coefficient data stored in the first coefficient register and outputs the logical product for each bit of the data for calculation and the first coefficient data; and a second logic circuit that is inputted with m-bit data outputted from the first logic circuit and outputs the exclusive logical sum of the m-bit data as the encoded data.

The shifter may shift sequentially bit by bit the data for encoding stored in the data-for-encoding storing register, and shift and input the shifted data into the data-for-calculation storing register.

The encoding circuit may further comprise an encoded data storing shift register that stores the encoded data outputted from the second logic circuit, wherein the encoded data has been shifted and inputted bit by bit into the encoded data storing shift register.

The encoding circuit may further comprise: a second coefficient register that stores m-bit second coefficient data indicating a second coefficient for executing encoding; and a selecting circuit that, based on a selecting signal inputted thereinto, selects and outputs either of the first coefficient data stored in the first coefficient register or the second coefficient data stored in the second coefficient register, wherein the first logic circuit outputs the logical product for each bit of: the data for calculation stored in the data-for-calculation storing register; and either the first coefficient data or the second coefficient data outputted from the selecting circuit.

The shifter, based on a controlling signal inputted thereinto, may be able to switch whether or not the data for encoding and the data for calculation are shifted.

The data-for-encoding storing register may be an n-bit data area of an accumulator, and the data-for-calculation storing register may be an m-bit data area that is continuously connected to the n-bit data area.

The encoded data outputted from the second logic circuit may be stored in a carry flag of the accumulator.

The encoding circuit may further comprise a carry flag outputting circuit that, based on a controlling signal inputted thereinto, outputs the data stored in the carry flag to the second logic circuit, in order to obtain as the encoded data the exclusive logical sum of the data stored in the carry flag and the m-bit data outputted from the first logic circuit.

In order to achieve the above object, according to another aspect of the present invention there is provided a digital signal processing circuit comprising an accumulator having an n-bit data-for-encoding storing area that stores data for encoding, and an m-bit data-for-calculation storing area that is continuously connected to the data-for-encoding storing area and that stores data for calculation generated by shifting the data for encoding; a shifter that shifts data stored in the accumulator; a first coefficient register that stores m-bit first coefficient data indicating a first coefficient for executing encoding; an encoding logic circuit that is inputted with the data for calculation stored in the data-for-calculation storing area and the first coefficient data stored in the first coefficient register, encodes the data for calculation based on the first coefficient data, and outputs the encoded data; an encoded data storing shift register that stores the encoded data outputted from the encoding logic circuit, wherein the encoded data has been shifted and inputted into the encoded data storing shift register; and a controlling circuit that, based on an encoding instruction, shifts and inputs the encoded data outputted from the encoding logic circuit into the encoded data storing shift register and causes the shifter to shift data stored in the accumulator from the data-for-encoding storing area toward the data-for-calculation storing area.

The encoding logic circuit may comprise a first logic circuit that is inputted with the data for calculation stored in the data-for-calculation storing area and the first coefficient data stored in the first coefficient register and outputs the logical product for each bit of the data for calculation and the first coefficient data; and a second logic circuit that is inputted with m-bit data outputted from the first logic circuit and outputs the exclusive logical sum of the m-bit data as the encoded data.

The shifter may shift sequentially bit by bit the data for encoding stored in the data-for-encoding storing area, and shift and input the shifted data into the data-for-calculation storing area.

The digital signal processing circuit may further comprise a second coefficient register that stores m-bit second coefficient data indicating a second coefficient for executing encoding; and a selecting circuit that, based on a selecting signal inputted thereinto, selects and outputs either of the first coefficient data stored in the first coefficient register or the second coefficient data stored in the second coefficient register, wherein the controlling circuit outputs the selecting signal to the selecting circuit based on the encoding instruction.

The controlling circuit, when the encoding instruction is a first instruction, may cause the shifter to shift by one bit the data stored in the accumulator from the data-for-encoding storing area toward the data-for-calculation storing area and, when the encoding instruction is a second instruction, may not cause the shifter to shift the data stored in the accumulator.

The encoded data outputted from the second logic circuit may be stored into a carry flag of the accumulator.

The digital signal processing circuit may further comprise a carry flag outputting circuit that, based on a controlling signal inputted thereinto, outputs the data stored in the carry flag to the second logic circuit, in order to obtain as the encoded data the exclusive logical sum of the data stored in the carry flag and the m-bit data outputted from the first logic circuit, wherein the controlling circuit outputs the controlling signal to the carry flag outputting circuit based on the encoding instruction.

BRIEF DESCRIPTION OF THE DRAWINGS

For more thorough understanding of the present invention and the advantages thereof, the following description should be referenced in conjunction with the accompanying drawings, in which.

DETAILED DESCRIPTION OF THE INVENTION

At least the following items will be made clear by description hereof and the accompanying drawings.

Overall Configuration

Figure 1:
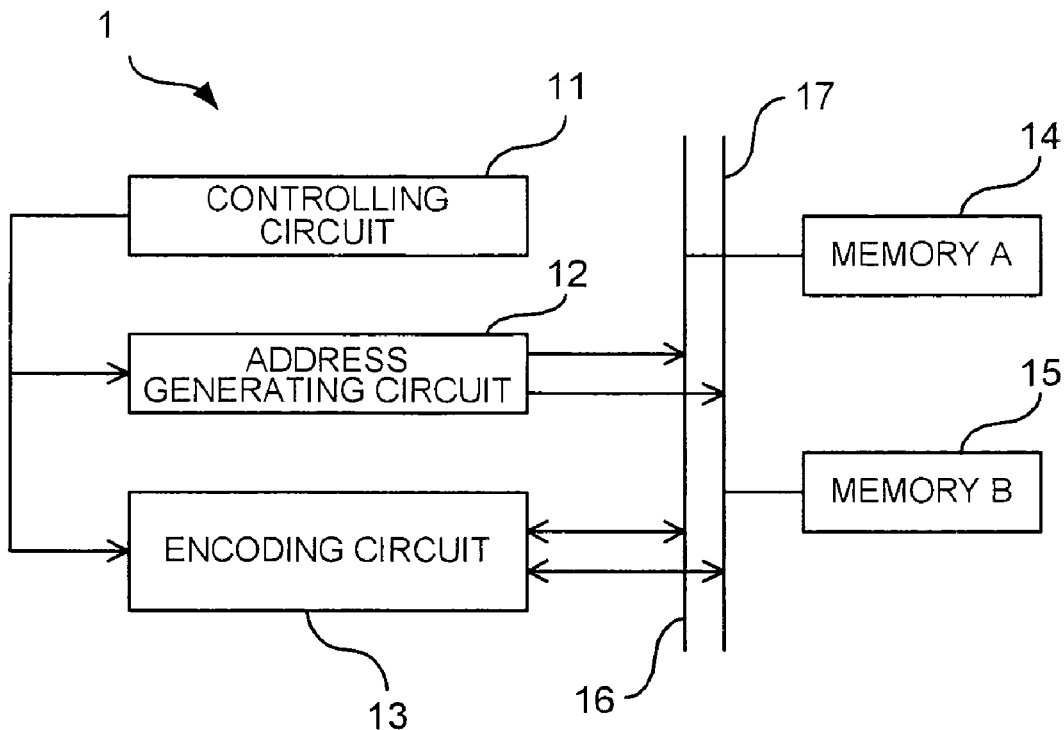
FIG. 1 depicts the configuration of a digital signal processing circuit that is an embodiment of the present invention.

FIG. 1 depicts the configuration of a digital signal processing circuit (hereinafter, "DSP (Digital Signal Processor)") that is an embodiment of the present invention. A DSP 1 includes a controlling circuit 11, an address generation circuit 12, an encoding circuit 13, a memory A 14, a memory B 15, and buses 16 and 17. The DSP 1 is used in a communicating apparatus such as a mobile phone and executes an encoding process and a decoding process using a convolution code to enable error correction on a communication path.

The controlling circuit 11 is a circuit that controls the DSP 1 by reading and executing a program stored in a memory not shown such as a Read Only Memory (ROM) or a Random Access Memory (RAM). The address generating circuit 12 is a circuit that generates an address to be outputted to the buses 16 and 17 under control of the controlling circuit 11. Based on the address outputted to the buses 16 and 17, reading of data stored in the address of the memory A 14 and the memory B 15 to a register, etc., in the encoding circuit 13 or writing of data retained by the encoding circuit 13 into the address of the memory A 14 and the memory B 15 is executed. The encoding circuit 13 is a circuit that encodes the data read from the memory A 14 or the memory B 15 under control of the controlling circuit 11.

The memory A 14 and the memory B 15 are readable and rewritable storing circuits that store data to be encoded, encoded data, etc., and are, for example, Random Access Memories (RAMs), etc. The memory A 14 and the memory B 15 can also transmit and receive data to/from a memory, not shown, such as a large-capacity Synchronous DRAM (SDRAM) provided outside the DSP 1. Thereby, the DSP 1 improves the processing speed thereof by parallel accessing to the memory A 14 and the memory B 15 and reduces the memory capacity therein. Thereby, the DSP 1 reduces the chip size thereof. The DSP 1 may include either the memory A 14 or the memory B 15 and may not transmit and receive the data to/from a memory not shown such as the SDRAM provided outside the DSP 1.

Figure 2:
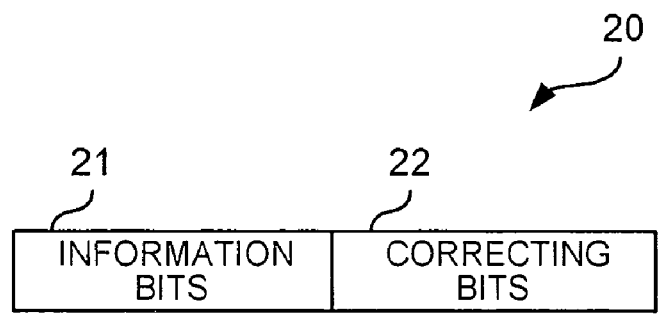
FIG. 2 depicts an exemplary configuration of communication data that a DSP transmits and receives.

FIG. 2 depicts an exemplary configuration of communication data that the DSP 1 transmits and receives. Communication data 20 includes information bits 21 indicating the information to be transmitted and correcting bits 22 to correct an error of the information bits 21. The DSP 1 for transmitting data generates the correcting bits 22 by providing the information bits 21 to the encoding circuit 13 and generates the communication data 20 by adding the generated correcting bits 22 to the information bits 21. When the DSP 1 for receiving data receives the communication data 20 added with the correcting bits 22, the DSP 1 for receiving generates correcting bits by providing the information bits 21 of the communication data 20 to the encoding circuit 13 and checks whether the generated correcting bits and the correcting bits 22 included in the communication data 20 coincide with each other. When those two groups of bits do not coincide with each other, the DSP 1 judges that an error has occurred to the information bits 21 and can correct the error of the information bits 21 by using the correcting bits 22.

Encoding Circuit

Figure 3:
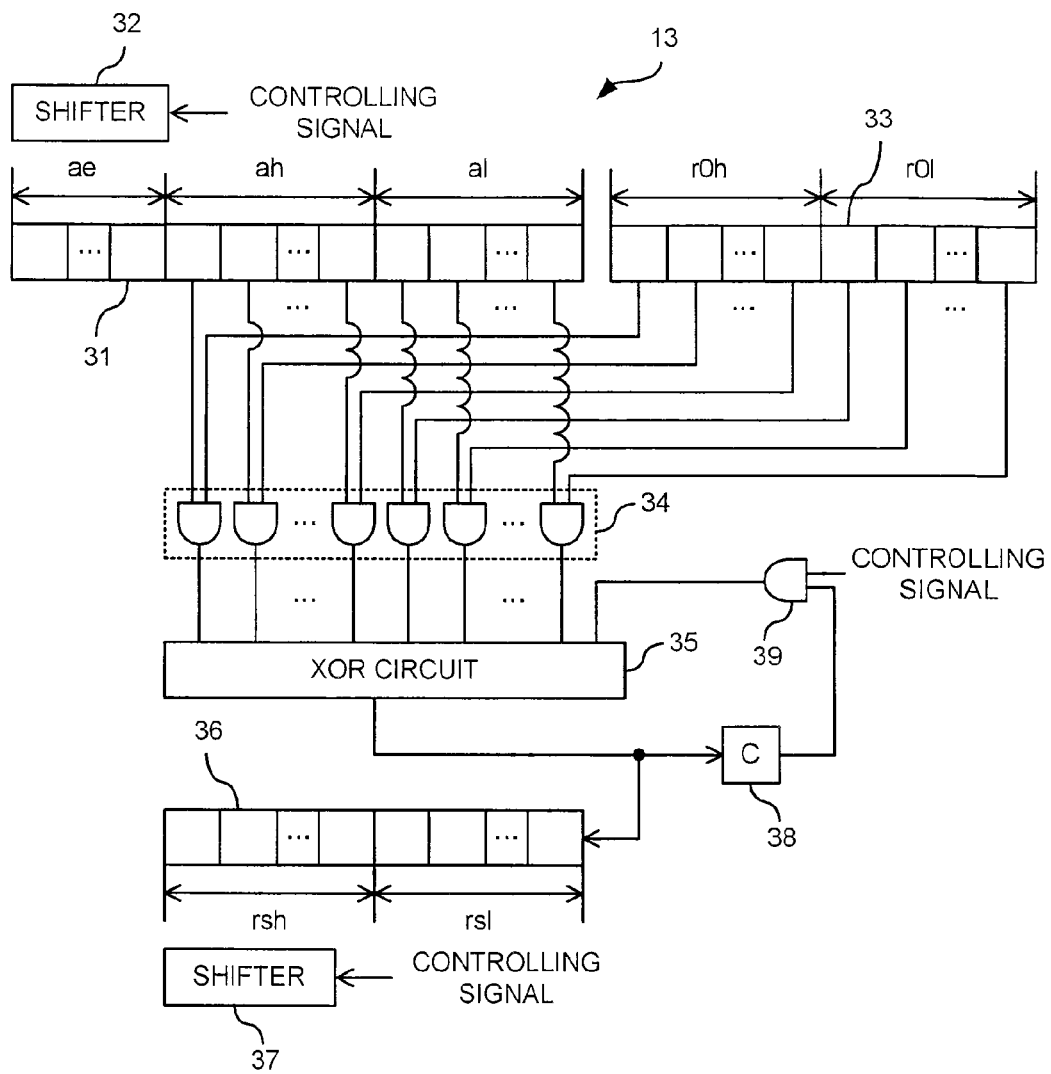
FIG. 3 depicts an exemplary configuration of an encoding circuit.

Description will be given for the configuration of the encoding circuit 13. FIG. 3 depicts an exemplary configuration of the encoding circuit 13. The encoding circuit 13 includes an accumulator (ax) 31, a shifter 32 for the accumulator 31, a data register (r0) 33, and an AND circuit (first logic circuit) 34, an XOR circuit (second logic circuit) 35, a data register (rs) 36, a shifter 37 for the data register 36, a carry flag 38 of the accumulator 31, and an AND circuit 39.

The accumulator (ax) 31 is configured by, for example, 40 bits and is provided with, for example, a data area ae for the upper eight bits and a data area for lower 32 bits. The data area for the lower 32 bits includes, for example, a data area ah for the upper 16 bits and a data area al for the lower 16 bits. The data area ae stores data to be encoded (data for encoding) formed by dividing the information bits 21 into, for example, eight-bit groups, that have been read from the memory A 14, the memory B 15, or other registers, etc., under control of the controlling circuit 11. In response to a controlling signal from the controlling circuit 11, the shifter 32 can shift the data stored in the accumulator 31. That is, the data for encoding stored in the data area ae is shifted to the right by the shifter 32 bit by bit and, thereby, is inputted sequentially into the data areas ah and al. The data stored in the data areas ah and al is used as data (data for calculation) to execute calculation for encoding.

Figure 4:
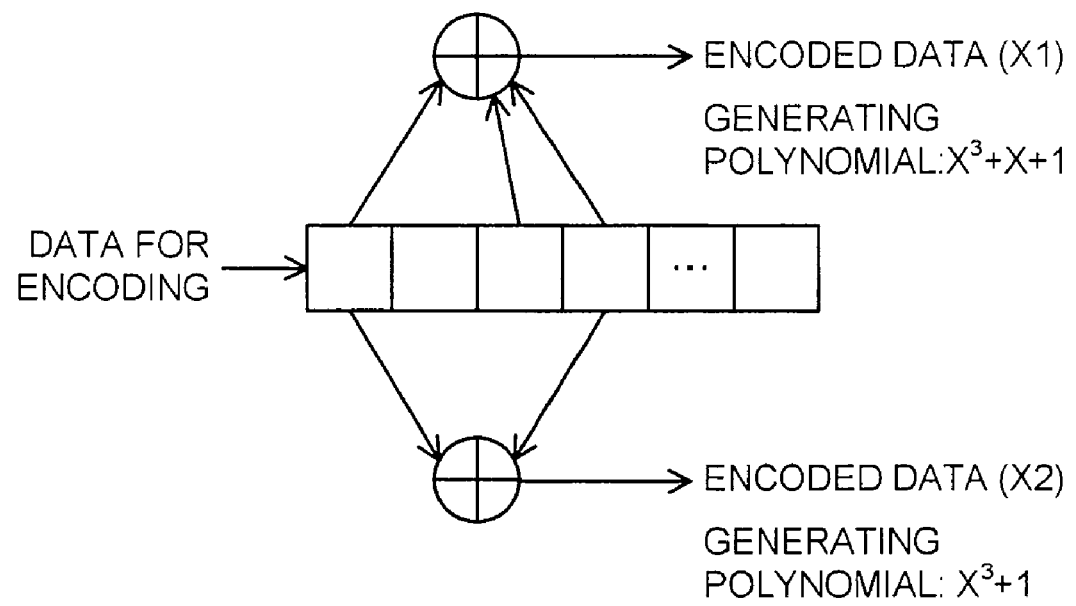
FIG. 4 depicts the relation between encoded data and a generating polynomial.

The data register (r0) 33 is configured by, for example, 32 bits and is provided with, for example, a data area r0h for the upper 16 bits and a data area r0l for the lower 16 bits. This data register (r0) 33 stores coefficient data indicating the coefficients of a generating polynomial for encoding. FIG. 4 depicts the relation between the encoded data and a generating polynomial. A generating polynomial to obtain encoded data X1 is $G(X)=X3+X+1$. In this case, 1011 (binary) in lowering order is set in the data register (r0) 33. That is, 0xb000 is set in the data area r0h and 0x0000 is set in the data area r0l. "0x" represents that the number is a hexadecimal number. A generating polynomial to obtain encoded data X2 is $G(X)=X3+1$. In this case, 1001 (binary) in lowering order is set in the data register (r0) 33. That is, 0x9000 is set in the data area r0h and 0x0000 is set in the data area r0l.

The AND circuit 34 is a circuit that outputs the logical product for each bit of the data for calculation stored in the data areas ah and al of the accumulator 31 and the coefficient data of the generating polynomials stored in the data register (r0) 33. Representing an "n"th bit in lowering order in the data area ah as ah(n), an "n"th bit in lowering order in the data area al as al(n), an "n"th bit in lowering order in the data area r0h as r0h(n), and an "n"th bit in lowering order in the data area r0l as r0l(n), the AND circuit 34 outputs ah(n)×r0h(n) and al(n)× r0l(n) (n=one to 16).

The XOR circuit 35 is a circuit that outputs as one-bit encoded data the exclusive logical sum of 32-bit data outputted from the AND circuit 34. The XOR circuit 35 can take the exclusive logical sum of the data stored in the carry flag 38 and the 32-bit data outputted from the AND circuit 34.

The data register (rs) 36 is configured by, for example, 32 bits and is provided with, for example, a data area rsh for the upper 16 bits and a data area rsl for the lower 16 bits. In response to a controlling signal from the controlling circuit 11, the shifter 37 can shift the data stored in the data register (rs) 36. When the encoded data outputted from XOR circuit 35 is stored in the data register (rs) 36, for example, after the shifter 37 has shifted to the left by one bit the data stored in the data register (rs) 36, the encoded data can be stored in at the lowest bits of the data register (rs) 35.

The carry flag 38 stores the one-bit encoded data outputted from the XOR circuit 35. The data stored in the carry flag 38 can be used for various calculation processes. In the embodiment, the data stored in the carry flag 38 is inputted into the XOR circuit 35 through the AND circuit 39. The AND circuit 39 is also inputted with the controlling signals from the controlling circuit 11 and, for example, when the controlling signal indicates "1", the data stored in the carry flag 38 is inputted into the XOR circuit 35. That is, the exclusive logical sum for generating the encoded data can be added with the encoded data immediately before the encoded data.

In the encoding circuit 13 configured as above, under control of the controlling circuit 11, the accumulator 31 is shifted bit by bit to the right and the data register 36 is shifted bit by bit to the left. Thereby, the encoded data is accumulated in the data register 36.

Figure 5:
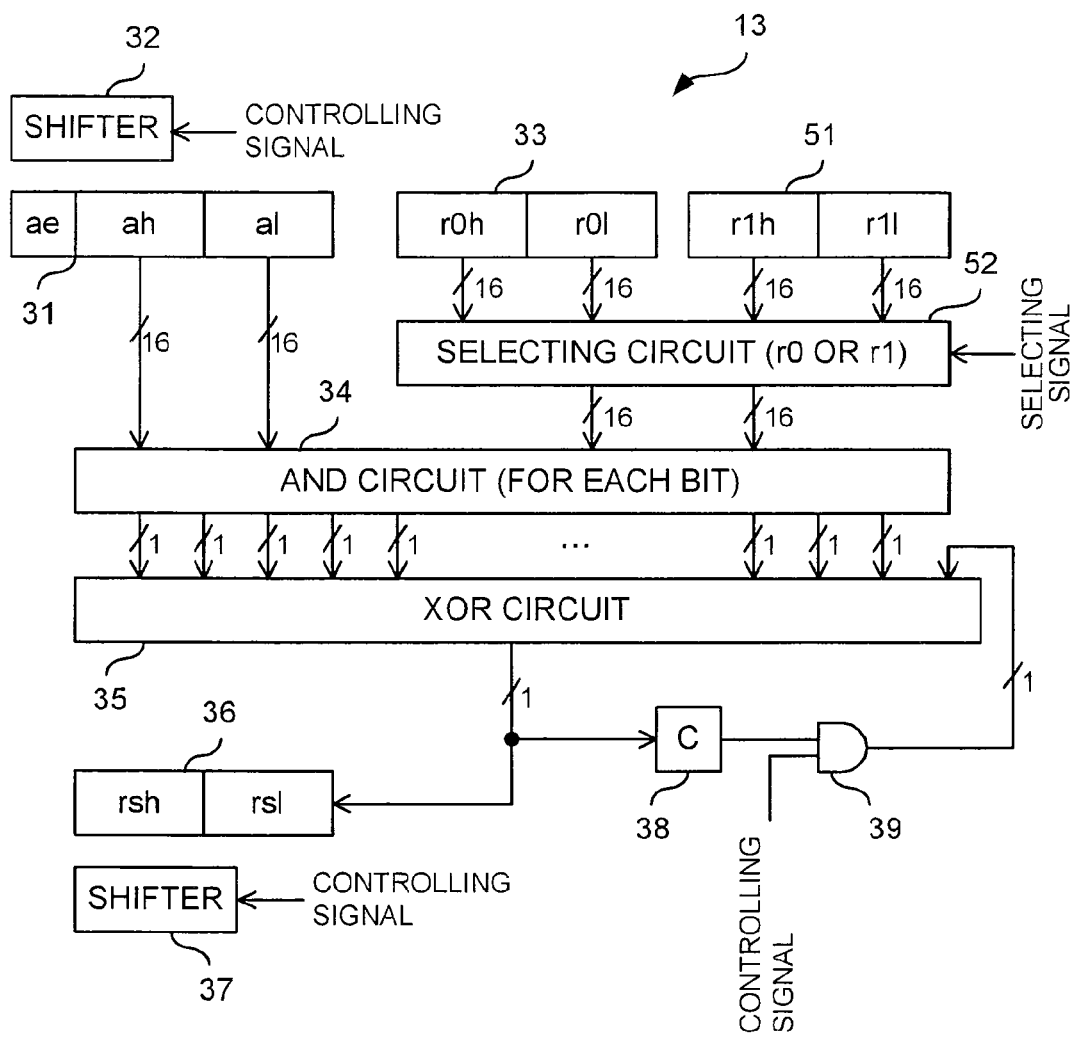
FIG. 5 depicts an exemplary configuration of an encoding circuit that can select coefficient data of the generating polynomial.

The encoding circuit 13 may be adapted to be able to select the coefficient data for the generating polynomials. FIG. 5 depicts an exemplary configuration of an encoding circuit that can select the coefficient data of the generating polynomials. In addition to the configuration shown in FIG. 3, the encoding circuit 13 includes a data register (r1) 51 and a selecting circuit 52. The data register (r1) 51 is configured by, for example, 32 bits and is provided with, for example, a data area r1h for the upper 16 bits and a data area r1l for the lower 16 bits. Similarly to the data register (r0) 33, this data register (r1) 51 stores coefficient data indicating the coefficients of a generating polynomial for encoding. The selecting circuit 52 outputs to the AND circuit 34 the coefficient data stored in either the data register (r0) 33 or the data register (r1) 51 based on a selecting signal from the controlling circuit 11. That is, by switching among the data registers to be used, encoded data based on a different generating polynomial can be generated. In the embodiment, the data registers that store the coefficient data are two that are the data register (r0) 33 and the data register (r1) 51. However, three or more data registers may be used.

The data area ae of the accumulator 31 corresponds to the register of the present invention that stores data for encoding and the data areas ah and al of the accumulator 31 correspond to the register of the invention that stores the data for calculation. The data register (r0) 33 corresponds to a first coefficient register of the present invention and the data register (r1) 51 corresponds to a second coefficient register of the present invention. The AND circuit 39 and the XOR circuit 35 correspond to the encoding logic circuit of the present invention. The data register (rs) 36 and the shifter 37 correspond to the encoded data storing shift register of the present invention.

Encoding Process

Description will be given for an encoding process using the encoding circuit 13 shown in FIG. 5. In the embodiment, it is assumed that four kinds of instructions that are a code instruction, a codec instruction, a codes instruction, and a codesc instruction are provided as encoding instructions to the DSP 1. By executing these instructions, the one-bit encoded data can be generated by using the coefficient data stored in the data register specified by an argument. According to the code instruction and the codes instruction, the input of the exclusive logical sum by the XOR circuit 35 does not include the data stored in the carry flag 38. According to the codec instruction and the codesc instruction, the input of the exclusive logical sum by the XOR circuit 35 includes the data stored in the carry flag 38. According to the code instruction and the codec instruction, no shift of the accumulator 31 is executed after the one-bit encoded data is generated. According to the codes instruction and the codesc instruction, the shift of the accumulator 31 is executed after the one-bit encoded data has been generated. The codes instruction and the codesc instruction correspond to a first instruction of the present invention and the code instruction and the codec instruction correspond to a second instruction of the present invention.

Figure 6:
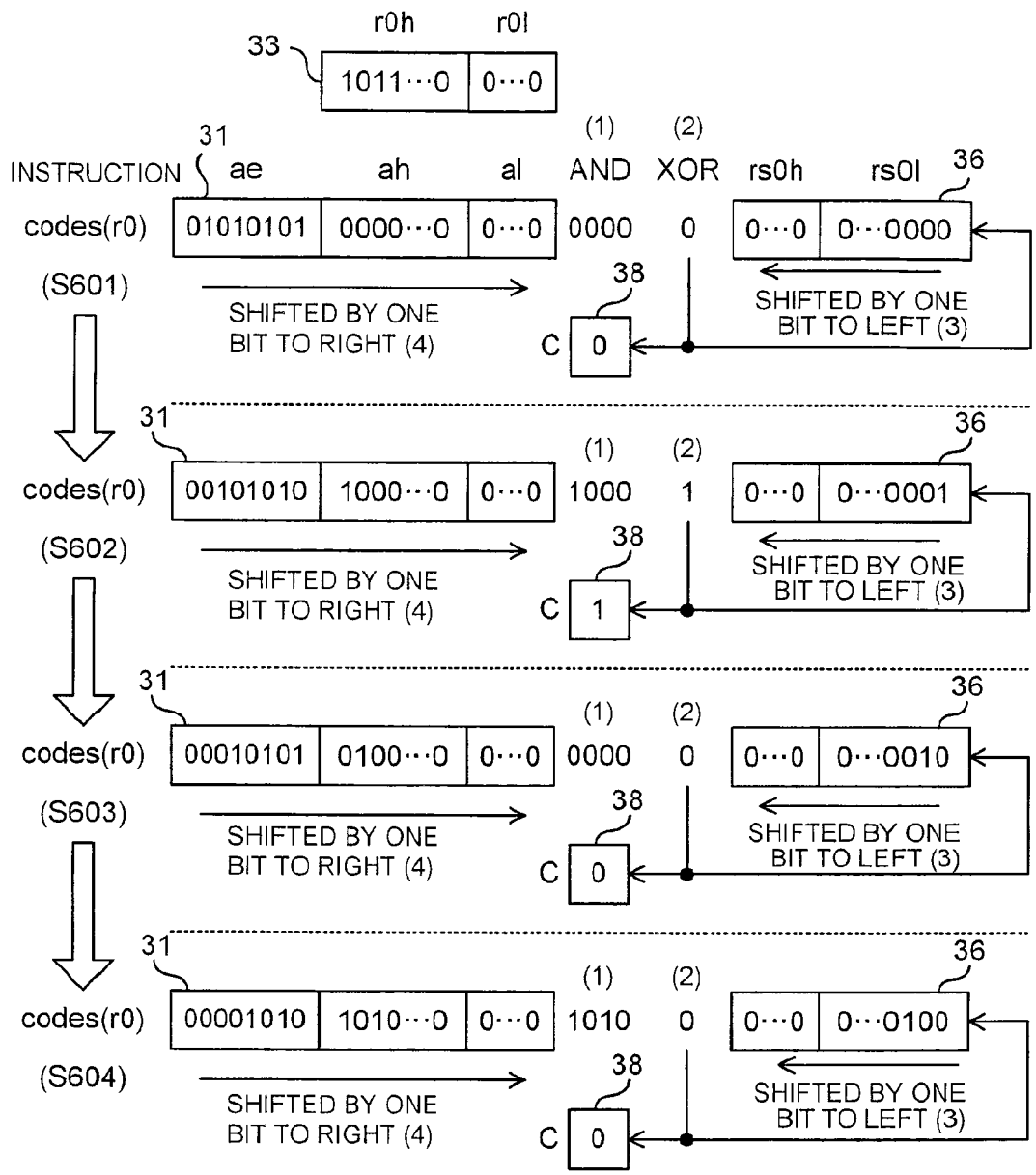
FIG. 6 depicts an example of a process to generate the encoded data based on one generating polynomial.

FIG. 6 depicts an example of a process to generate the encoded data based on one generating polynomial. In this example, it is assumed that the generating polynomial is $G(X)=X3+X+1$. In this case, a coefficient in encoding (a first coefficient) is 1011 (binary). It is assumed that, under control of the controlling circuit 11, the coefficient data 0xb000 is set in the data area r0h of the data register 33 and the coefficient data 0x0000 is set in the data area r0l of the data register 33. It is also assumed that, under control of the controlling circuit 11, the eight-bit data for encoding 01010101 (binary) is set in the data area ae of the accumulator 31.

In such a state, when the codes (r0) instruction is executed (S601), the data register (r0) 33 is selected under control of the controlling circuit 11 and the AND circuit 34 outputs the logical product for each bit of the data for calculation stored in the data areas ah and al of the accumulator 31 and the coefficient data stored in the data register 33. In this case, the output of the AND circuit 34 is 0x0000. In FIG. 6, the upper four bits of the output of the AND circuit 34 are represented in binary notation. Because the instruction is the codes instruction, the controlling circuit 11 outputs, for example, "0" to the AND circuit 39. Thereby, the data stored in the carry flag 38 is not inputted into the XOR circuit 35. Therefore, when the AND circuit 34 outputs 0x0000, the output of the XOR circuit 35 is "0". Under control of the controlling circuit 11, the shifter 37 shifts by one bit to the left the data stored in the data register 36 and the one-bit encoded data "0" outputted from the XOR circuit 35 is stored at the lowest bit of the data register 36. The carry flag 38 also stores the one-bit encoded data "0". Thereafter, under control of the controlling circuit 11, the shifter 32 shifts by one bit to the right the data stored in the accumulator 31. The series of steps up to this are executed for one codes (r0) instruction (S601).

When the instruction is the codesc (r0), the controlling circuit 11 outputs, for example, "1" to the AND circuit 39. Thereby, the data stored in the carry flag 38 is inputted into the XOR circuit 35 and the exclusive logical addition is executed together with the data outputted from the AND circuit 34. The same procedure is taken for the steps after this.

When the codes (r0) instruction is executed (S602), an encoding process is executed similarly to the previous step (S601). Because the data stored in the accumulator 31 has been shifted by one bit to the right at the previous step (S601), the upper four bits of the data area ah of the accumulator 31 are 1000 (binary). Therefore, the upper four bits of the output of the AND circuit 34 are 1000 (binary) and the output of the XOR circuit 35 is "1". The one-bit encoded data "1" is shifted and inputted into the data register 36 and is stored in the carry flag 38. Thereafter, the data stored in the accumulator 31 is shifted by one bit to the right.

Similarly, the codes (r0) instruction is executed (S603). Because the data stored in the accumulator 31 has been shifted by one bit to the right at the previous step (S602), the upper four bits of the data area ah of the accumulator 31 are 0100 (binary). Therefore, the upper four bits of the output of the AND circuit 34 are 0000 (binary) and the output of the XOR circuit 35 is "0". The one-bit encoded data "0" is shifted and inputted into the data register 36 and is stored in the carry flag 38. Thereafter, the data stored in the accumulator 31 is shifted by one bit to the right.

Similarly, the codes (r0) instruction is further executed (S604). Because the data stored in the accumulator 31 has been shifted by one bit to the right at the previous step (S603), the upper four bits of the data area ah of the accumulator 31 are 1010 (binary). Therefore, the upper four bits of the output of the AND circuit 34 are 1010 (binary) and the output of the XOR circuit 35 is "0". The one-bit encoded data "0" is shifted and inputted into the data register 36 and is stored in the carry flag 38. Thereafter, the data stored in the accumulator 31 is shifted by one bit to the right.

In this manner, by executing the codes (r0) instruction repeatedly, the data obtained by encoding the data for encoding stored in the data areas ae of the accumulator 31 based on the generating polynomial $G(X)=X^3+X+1$ is accumulated in the data register 36.

Figure 7:
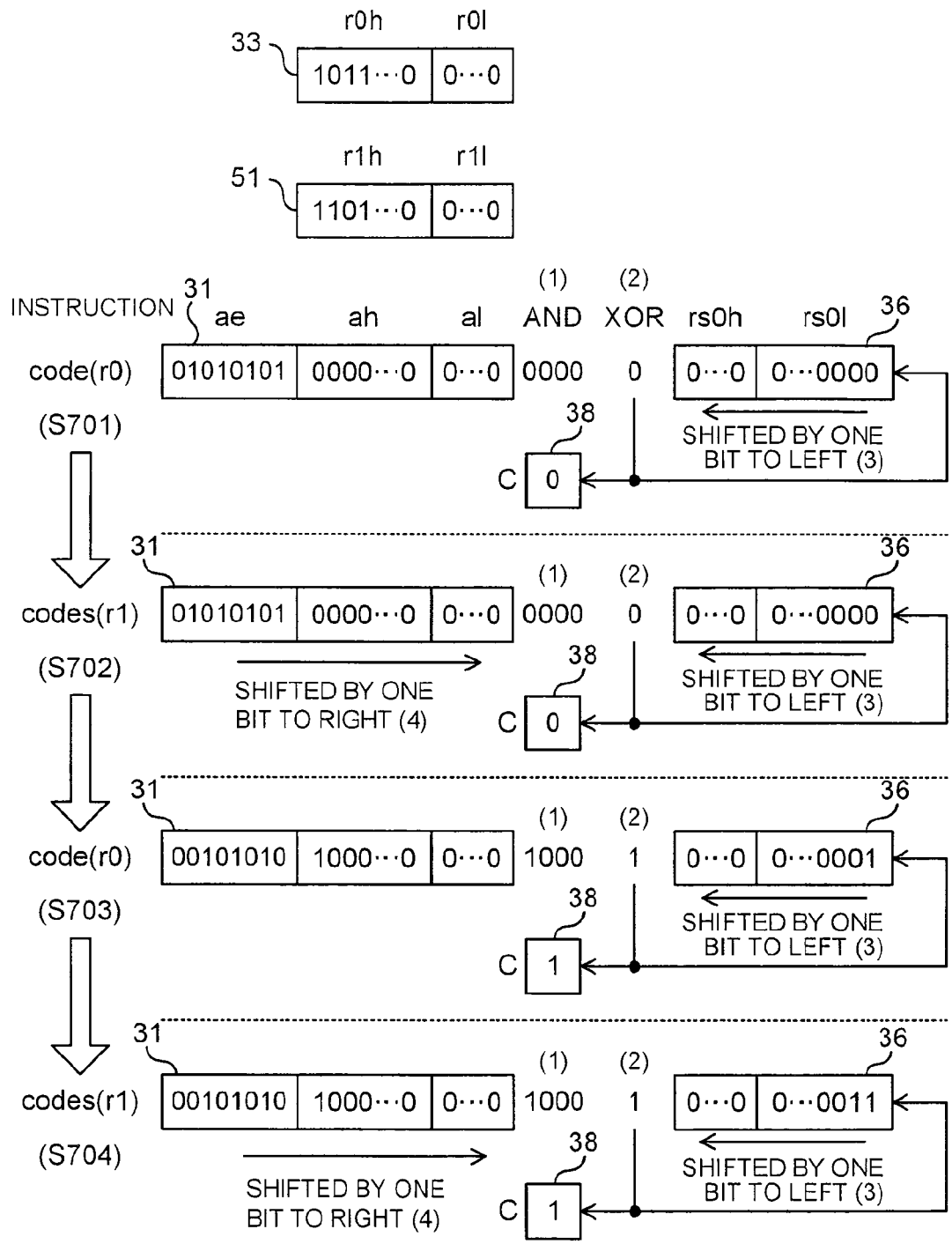
FIG. 7 depicts an example of a process to generate encoded data based on two generating polynomials.

FIG. 7 depicts an example of a process to generate the encoded data based on two generating polynomials. In this example, it is assumed that the generating polynomials are two that are $G(X)=X^3+X+1$ and $G(X)=X^3+X^2+1$. In this case, for encoding, a first coefficient is 1011 (binary) and a second coefficient is 1101 (binary). It is assumed that, under control of the controlling circuit 11, coefficient data 0xb000 is set in the data area r0$h$ of the data register 33 and coefficient data 0x0000 is set in the data area r0$l$ of the data register 33. It is assumed that, under control of the controlling circuit 11, coefficient data 0xd000 is set in the data area r1$h$ of the data register 51 and coefficient data 0x0000 is set in the data area r1$l$ of the data register 51. It is assumed that, under control of the controlling circuit 11, the eight-bit data for encoding 01010101 (binary) is set in the data area ae of the accumulator 31.

In such a state, when the code (r0) instruction is executed (S701), the data register (r0) 33 is selected under control of the controlling circuit 11 and the AND circuit 34 outputs the logical product for each bit of the data for calculation stored in the data areas ah and al of the accumulator 31 and the coefficient data stored in the data register 33. In this case, the output of the AND circuit 34 is 0x0000. Because the instruction is the code instruction, the data stored in the carry flag 38 is not inputted into the XOR circuit 35. Therefore, when the AND circuit 34 outputs 0x0000, the output of the XOR circuit 35 is "0". Under control of the controlling circuit 11, the shifter 37 shifts by one bit to the left the data stored in the data register 36 and the one-bit encoded data "0" outputted from the XOR circuit 35 is stored at the lowest bit of the data register 36. The carry flag 38 also stores the one-bit encoded data "0". Because the instruction is the code instruction, the controlling circuit 11 inputs a controlling signal to the shifter 32 to prevent the data stored in the accumulator 31 from being shifted. The series of steps up to this are executed for a code (r0) instruction (S701).

The codes (r1) instruction is executed (S702). Because the data stored in the accumulator 31 is not shifted at the previous step (S701), the upper four bits in the data areas ah of the accumulator 31 are still 0000 (binary). The data register (r1) 51 is selected under control of the controlling circuit 11 and the AND circuit 34 outputs the logical production for each bit of the data for calculation stored in the data areas ah and al of the accumulator 31 and the coefficient data stored in the data register 51. In this case, the upper four bits of the output of the AND circuit 34 are 0000 and the output of the XOR circuit 35 is "0". Under control of the controlling circuit 11, the shifter 37 shifts by one bit to the left the data stored in the data register 36 and the one-bit encoded data "0" outputted from the XOR circuit 35 is stored at the lowest bit of the data register 36. The carry flag 38 also stores the one-bit encoded data "0". Thereafter, because the instruction is the codes instruction, under control of the controlling circuit 11, the shifter 32 shifts by one bit to the right the data stored in the accumulator 31.

The code (r0) instruction is executed (S703). Because the data stored in the accumulator 31 has been shifted by one bit to the right at the previous step (S702), the upper four bits of the data area ah of the accumulator 31 are 1000 (binary). The data register (r0) 33 is selected under control of the controlling circuit 11 and the upper four bits of the output of the AND circuit 34 are 1000 (binary) and the output of the XOR circuit 35 is "1". The one-bit encoded data "1" is shifted and inputted into the data register 36 and is stored in the carry flag 38. Because the instruction is the code instruction, similarly to the previous step (S701), no shift is executed of the data stored in the accumulator 31.

The codes (r1) instruction is executed (S704). Because the data stored in the accumulator 31 has not been shifted at the previous step (S703), the upper four bits of the data area ah of the accumulator 31 are still 1000 (binary). The data register (r1) 51 is selected under control of the controlling circuit 11 and the upper four bits of the output of the AND circuit 34 is 1000 (binary). The output of the XOR circuit 35 is "1". The one-bit encoded data "1" is inputted into the data register 36 and is stored in the carry flag 38. Thereafter, because the instruction is the codes instruction, the data stored in the accumulator 31 is shifted by one bit to the right.

In this manner, by executing the code (r0) instruction and the codes (r1) instruction repeatedly, the data obtained by encoding the data for encoding stored in the data area ae of the accumulator 31 based on the generating polynomials $G(X)=X3+X+1$ and $G(X)=X3+X2+1$ is accumulated in the data register 36.

The description for the DSP 1 of the embodiment has been described. In such a DSP 1, every time any one of the code instruction, the codec instruction, the codes instruction, and the codesc instruction is executed, one-bit encoded data is generated. That is, several cycles of processes such as a shifting process, a process to execute logical product, a process to execute exclusive logical addition are not necessary to generate the one-bit encoded data and, therefore, an encoding process can be executed at a high speed. Therefore, high speed data communication can be coped with using the DSP 1. The size of the program can also be reduced and, thereby, the memory area necessary for storing the program can be reduced.

By shifting and inputting the one-bit encoded data sequentially into the data register 36, encoded data of a plurality of bits can be obtained for data of a plurality of bits for encoding.

In the DSP 1, generating polynomials can be switched among them using the argument of an encoding instruction. That is, it is not necessary to re-set coefficient data in a register to switch the generating polynomials among them and, therefore, an encoding process can be executed at a high speed.

In the DSP 1, depending on the type of an encoding instruction, whether the data stored in the accumulator 31 is shifted after the one-bit encoded data has been generated can be selected. Therefore, when encoded data is generated based on a plurality of generating polynomials, it is not necessary to execute any process for each generating polynomial after storing the data for encoding into a plurality of registers. Therefore, the encoding process can be executed at a high speed and the resources necessary for the processes such as a register, etc., can be reduced.

In DSP 1, the generated one-bit encoded data is stored in the carry flag 38. Therefore, the encoded data stored in the carry flag 38 can be used for various processes in the DSP 1. An example considered can be the case where the number of times at which "1" is respectively stored consecutively into the carry flag 38 is counted and, when the number of times has exceeded a predetermined number of times, a process for abnormality is executed.

In the DSP 1, depending on the type of an encoding instruction, the data stored in the carry flag 38 can be the input of the XOR circuit 35. Thereby, the encoded data that uses the immediately previous encoded data can be generated at a high speed.

The above embodiment is to facilitate the understanding of the present invention and is not an embodiment to interpret the present invention limiting the present invention. The present invention can be modified and improved without departing from the scope thereof and includes the equivalents thereof. For example, though the data for encoding is shifted sequentially bit by bit in the embodiment, a plurality of bits can be shifted for an instruction. The encoding circuit 13 can be used in not only the DSP 1 but also various circuits that execute the encoding process. Though the convolution coding is exemplified as the encoding scheme in the embodiment, the encoding scheme is not limited to this and the present invention can be applied to a block code, etc.

What is claimed is:

1. An encoding circuit comprising:
    a data-for-encoding storing register that stores n-bit data for encoding;
    a data-for-calculation storing register that stores m-bit data for calculation generated by shifting the data for encoding;
    a shifter that shifts the data for encoding stored in the data-for-encoding storing register, and shifts and inputs the shifted data into the data-for-calculation storing register;
    a first coefficient register that stores m-bit first coefficient data indicating a first coefficient for executing encoding; and
    an encoding logic circuit that is inputted with the data for calculation stored in the data-for-calculation storing register and the first coefficient data stored in the first coefficient register, encodes the data for calculation based on the first coefficient data, and outputs the encoded data.

2. The encoding circuit of claim 1, wherein
the encoding logic circuit comprises:
    a first logic circuit that is inputted with the data for calculation stored in the data-for-calculation storing register and the first coefficient data stored in the first coefficient register and outputs the logical product for each bit of the data for calculation and the first coefficient data; and
    a second logic circuit that is inputted with m-bit data outputted from the first logic circuit and outputs the exclusive logical sum of the m-bit data as the encoded data.

3. The encoding circuit of claim 2, wherein
the shifter shifts sequentially bit by bit the data for encoding stored in the data-for-encoding storing register, and shifts and inputs the shifted data into the data-for-calculation storing register.

4. The encoding circuit of claim 2, further comprising
an encoded data storing shift register that stores the encoded data outputted from the second logic circuit, wherein the encoded data has been shifted and inputted bit by bit into the encoded data storing shift register.

5. The encoding circuit of claim 3, further comprising
an encoded data storing shift register that stores the encoded data outputted from the second logic circuit, wherein the encoded data has been shifted and inputted bit by bit into the encoded data storing shift register.

6. The encoding circuit of claim 2, further comprising:
    a second coefficient register that stores m-bit second coefficient data indicating a second coefficient for executing encoding; and
    a selecting circuit that, based on a selecting signal inputted thereinto, selects and outputs either of the first coefficient data stored in the first coefficient register or the second coefficient data stored in the second coefficient register, wherein
the first logic circuit outputs the logical product for each bit of: the data for calculation stored in the data-for-calculation storing register; and either the first coefficient data or the second coefficient data outputted from the selecting circuit.

7. The encoding circuit of claim 3, further comprising:
    a second coefficient register that stores m-bit second coefficient data indicating a second coefficient for executing encoding; and
    a selecting circuit that, based on a selecting signal inputted thereinto, selects and outputs either of the first coefficient data stored in the first coefficient register or the second coefficient data stored in the second coefficient register, wherein the first logic circuit outputs the logical product for each bit of: the data for calculation stored in the data-for-calculation storing register; and either the first coefficient data or the second coefficient data outputted from the selecting circuit.

8. The encoding circuit of claim 4, further comprising:

a second coefficient register that stores m-bit second coefficient data indicating a second coefficient for executing encoding; and a selecting circuit that, based on a selecting signal inputted thereinto, selects and outputs either of the first coefficient data stored in the first coefficient register or the second coefficient data stored in the second coefficient register, wherein the first logic circuit outputs the logical product for each bit of: the data for calculation stored in the data-for-calculation storing register; and either the first coefficient data or the second coefficient data outputted from the selecting circuit.

9. The encoding circuit of claim 5, further comprising:

a second coefficient register that stores m-bit second coefficient data indicating a second coefficient for executing encoding; and a selecting circuit that, based on a selecting signal inputted thereinto, selects and outputs either of the first coefficient data stored in the first coefficient register or the second coefficient data stored in the second coefficient register, wherein the first logic circuit outputs the logical product for each bit of: the data for calculation stored in the data-for-calculation storing register; and either the first coefficient data or the second coefficient data outputted from the selecting circuit.

10. The encoding circuit of claim 6, wherein the shifter, based on a controlling signal inputted thereinto, is able to switch whether or not the data for encoding and the data for calculation are shifted.

11. The encoding circuit of claim 2, wherein the data-for-encoding storing register is an n-bit data area of an accumulator, and wherein the data-for-calculation storing register is an m-bit data area that is continuously connected to the n-bit data area.

12. The encoding circuit of claim 11, wherein the encoded data outputted from the second logic circuit is stored in a carry flag of the accumulator.

13. The encoding circuit of claim 12, further comprising a carry flag outputting circuit that, based on a controlling signal inputted thereinto, outputs the data stored in the carry flag to the second logic circuit, in order to obtain as the encoded data the exclusive logical sum of the data stored in the carry flag and the m-bit data outputted from the first logic circuit.

14. A digital signal processing circuit comprising:

an accumulator having an n-bit data-for-encoding storing area that stores data for encoding, and an m-bit data-for-calculation storing area that is continuously connected to the data-for-encoding storing area and that stores data for calculation generated by shifting the data for encoding;

a shifter that shifts data stored in the accumulator;

a first coefficient register that stores m-bit first coefficient data indicating a first coefficient for executing encoding;

an encoding logic circuit that is inputted with the data for calculation stored in the data-for-calculation storing area and the first coefficient data stored in the first coefficient register, encodes the data for calculation based on the first coefficient data, and outputs the encoded data;

an encoded data storing shift register that stores the encoded data outputted from the encoding logic circuit, wherein the encoded data has been shifted and inputted into the encoded data storing shift register; and a controlling circuit that, based on an encoding instruction, shifts and inputs the encoded data outputted from the encoding logic circuit into the encoded data storing shift register and causes the shifter to shift data stored in the accumulator from the data-for-encoding storing area toward the data-for-calculation storing area.

15. The digital signal processing circuit of claim 14, wherein the encoding logic circuit comprises:

a first logic circuit that is inputted with the data for calculation stored in the data-for-calculation storing area and the first coefficient data stored in the first coefficient register and outputs the logical product for each bit of the data for calculation and the first coefficient data; and a second logic circuit that is inputted with m-bit data outputted from the first logic circuit and outputs the exclusive logical sum of the m-bit data as the encoded data.

16. The digital signal processing circuit of claim 15, wherein the shifter shifts sequentially bit by bit the data for encoding stored in the data-for-encoding storing area, and shifts and inputs the shifted data into the data-for-calculation storing area.

17. The digital signal processing circuit of claim 15, further comprising:

a second coefficient register that stores m-bit second coefficient data indicating a second coefficient for executing encoding; and a selecting circuit that, based on a selecting signal inputted thereinto, selects and outputs either of the first coefficient data stored in the first coefficient register or the second coefficient data stored in the second coefficient register, wherein the controlling circuit outputs the selecting signal to the selecting circuit based on the encoding instruction.

18. The digital signal processing circuit of claim 17, wherein the controlling circuit, when the encoding instruction is a first instruction, causes the shifter to shift by one bit the data stored in the accumulator from the data-for-encoding storing area toward the data-for-calculation storing area and, when the encoding instruction is a second instruction, does not cause the shifter to shift the data stored in the accumulator.

19. The digital signal processing circuit of claim 16, wherein the encoded data outputted from the second logic circuit is stored into a carry flag of the accumulator.

20. The digital signal processing circuit of claim 19, further comprising a carry flag outputting circuit that, based on a controlling signal inputted thereinto, outputs the data stored in the carry flag to the second logic circuit, in order to obtain as the encoded data the exclusive logical sum of the data stored in the carry flag and the m-bit data outputted from the first logic circuit, wherein the controlling circuit outputs the controlling signal to the carry flag outputting circuit based on the encoding instruction.

* * * * *